Jan. 4, 1938. T. SCHISGALL 2,104,104
COMPACT OR THE LIKE
Filed May 22, 1935
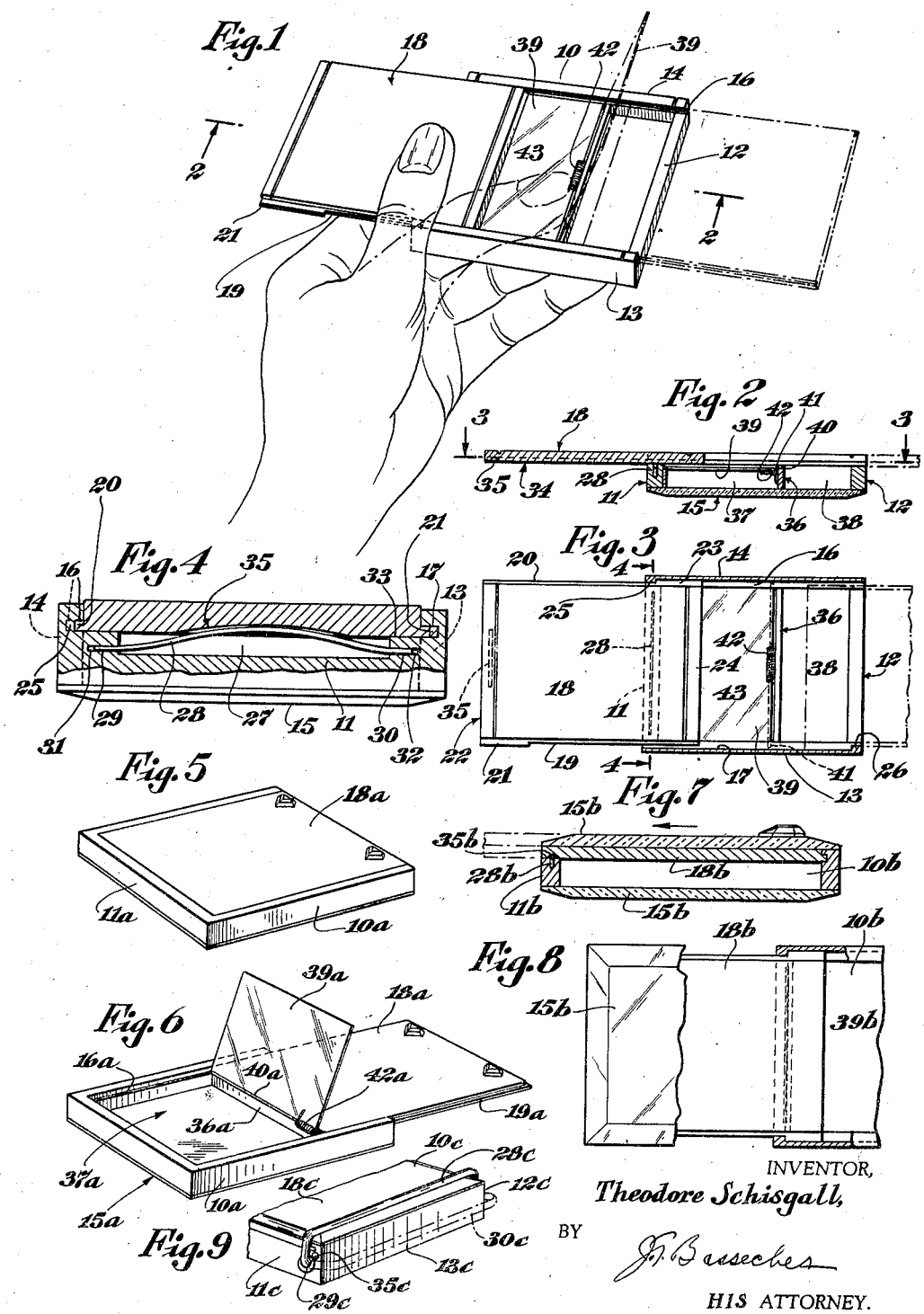
INVENTOR,
Theodore Schisgall,
BY
HIS ATTORNEY.

Patented Jan. 4, 1938

2,104,104

UNITED STATES PATENT OFFICE 2,104,104

COMPACT OR THE LIKE

Theodore Schisgall, New York, N. Y.

Application May 22, 1935, Serial No. 22,703

2 Claims. (Cl. 132—83)

This invention relates to novelty boxes, such as compacts or the like.

It is an object of my invention to provide a novelty container in the nature of compacts for cosmetics.

It is further contemplated as an object of my invention to provide a novelty container in the nature of a compact with cosmetics which includes as features thereof ready accessibility of operation, particularly one in which a container including a cover can be operated with one hand, so that access may be had by operation with one hand, leaving the other hand free to reach the contents of the container or compact, such as cosmetic preparations, including powder, rouge and lipstick.

It is further contemplated as an object of my invention to provide a novelty container for cosmetics or the like, in which a closure member is readily and facilely operated to render the contents accessible, while assuring effective closure of the container to prevent accidental discharge of the contents.

It is further contemplated as an object of my invention to provide a novelty container in the nature of a compact, which permits ready and facile operation involving not only the use of the fingers of one hand, but also so positions the closure in relation to the container that mirror devices associated therewith may be rendered readily accessible for applying the "make up" and to facilely reach the various contents of a compact, leaving the user the freedom of the hands to the maximum extent.

Other objects of my invention reside in the provision of a novelty container including features for operating and maintaining closed a closure member therefor, combining compactness with facility of operation, having utility not only in relation to novelty boxes for cosmetics, but also other fields of usefulness.

To attain these objects and such further objects as may appear herein or may be hereinafter pointed out, I make reference to the accompanying drawing, in which:—

Figure 1 is a perspective view, showing one embodiment of my device and the manner of operation;

Figure 2 is a section taken on the line 2—2 of Figure 1;

Figure 3 is a plan view thereof;

Figure 4 is a fragmentary section taken on the line 4—4 of Figure 3, with the closure member in the closed position;

Figure 5 is a perspective view of another embodiment of my invention, with the closure member in a closed position;

Figure 6 is a perspective view of the embodiment shown in Figure 5, with the closure member in the open position;

Figure 7 is a longitudinal sectional view of another embodiment of my invention;

Figure 8 is a fragmentary plan view, partly in section, of the embodiment shown in Figure 7, with the cover member open;

Figure 9 is a fragmentary perspective view, showing my invention with another embodiment of latching means for the closure.

Making reference to the drawing, there is shown a container 10, preferably rectangular in form and which may be made from wood, metal or synthetic plastics, such as phenol formaldehyde condensation resins.

The container is formed with end walls 11 and 12 and side walls 13 and 14.

Where the container is formed from wood, these members may be suitably jointed to each other by dove-tailed joints. Where the container is made of synthetic plastics or metals, the walls outlined above may be of integral construction. The walls outlining the container above described are provided with a bottom member 15 and this may preferably be a bevelled mirror adhesively connected to the walls previously referred to.

The walls 13 and 14 above referred to are extended above the upper edges of the walls 11 and 12 and are provided with longitudinal grooves 16 and 17 extending substantially throughout the entire length of the walls 13 and 14, respectively.

With the construction thus provided, there is combined a cover member 18 formed with lateral tongues 19 and 20, loosely fitting within the longitudinal grooves 16 and 17, respectively, permitting the cover member 18 to slide freely in either direction, as shown more clearly in Figures 1, 2 and 3. The lateral tongue 19 is formed with an extension 21, adjacent the end 22 of the cover member. The lateral tongue 20 is formed with an extension 23 adjacent the end 24 of the cover member. In manufacture, after disposing the cover member 18 so as to have the tongues 19 and 20 and their extensions slide within the grooves 17 and 16, respectively, provision is made to prevent displacement from this position. When so disposed, so as to have the cover member completely in alignment with the outlines of the container, there is inserted a fillet 25 adjacent the wall 11 into the groove 16. A fillet 26 is inserted in the groove 17 adjacent the wall 12. In operation, in sliding the cover member 18 in the left-hand direction, the extension 23 will engage the fillet 25, preventing removal of the cover in the left-hand direction. When sliding the closure member 18 in the right-hand direction, the extension 21 will engage the fillet 26, preventing complete displacement of the cover member from the groove when the cover member is moved in the right-hand direction.

Referring now to the wall 11, adjacent its upper edge, there is formed a slot 27 within which there is disposed a bowed spring wire 28 anchored at its ends 29 and 30 in orifices 31 and 32. In its normal position, the bowed spring wire 28 extends above the upper edge 33 of the wall 11 into the plane of the lower surface 34 of the cover member 18. On the face 34 of the cover member 18 there is formed a longitudinal recess 35, which is disposed in relation to the bowed spring member 28, so that when the cover member 18 is aligned with the outlines of the walls of the container 10, a medial portion of the bowed spring 28 will enter into the recess 35, providing sufficient frictional engagement to prevent accidental or gravitational sliding of the cover member from the aligned position, but offering insufficient friction to resist a positive sliding movement by the fingers of the hand.

Within the container defined by the walls 11, 12, 13 and 14, there is anchored a partition 36, dividing the container into compartments 37 and 38. The partition 36 is arranged to lie flush with the lower face 34 of the cover member 18. Attached to the partition 36, I provide a closure 39 using a hinge 40. To the pintle 41 formed by the hinge 40, there is affixed a coiled spring 42 arranged to urge the closure 39 in the open position, as shown in dotted lines in Figure 1. The closure 39 is maintained in the covering position shown more clearly in Figure 2, by the cover member 18. When the cover member is slid in the left-hand direction, as shown in Figures 1 and 2, the closure 39 will be maintained in the covering position. When the cover member 18 is slid in the right-hand direction to substantially the limit of its position, as shown more clearly in dotted line in Figure 1, the closure 39 will spring open, rendering the contents of the compartment 37 accessible.

It will thus be apparent, by a simple manipulation of the thumb of the hand of the user, as shown more clearly in Figure 1, that a left-hand sliding movement of the cover member 18 will render the compartment 38 accessible. A right-hand movement of the thumb actuating the cover member 18 and sliding the same in a right-hand direction to substantially the limits of its movement, will result in permitting the closure member 39 to spring open, rendering the compartment 37 accessible.

It is preferred by me to make the closure member 39 of thin metal with a highly polished surface acting as a mirror, so that when the cover member 18 is slid to substantially the extreme left-hand position in viewing the interior of the container, a mirrored surface 43 is presented to view, permitting rouge or lipstick to be applied for "make up" purposes, with the minimum manipulation, and without changing position in holding the container.

Likewise, in sliding the cover member 18 to substantially the extreme right-hand position, as shown in dotted line in Figure 1, the compartment 37 is rendered accessible and the lower surface of the closure member 39 provides a mirrored surface.

In general, it will be observed that I have provided a novelty container in the nature of a compact which is readily manipulated by one hand of the user, leaving the other hand free and that in the normal position for operation for opening the compact or container, the contents will not be accidentally loosened or fall out from the container.

In general, it will also be observed that the operation for uncovering the contents of the container will at the same time, present the mirrored surfaces to view, to facilitate the application of the "make up".

In Figure 5, I have shown a container in the form of a compact 10a having a closure member 18a constructed substantially in the form as shown in Figure 1, except, however, that in this embodiment, the left-hand wall 11a is extended to the same depth as the side walls, thereby forming an abutment limiting the left-hand sliding movement of the cover member 18a to the aligned position. The cover member 18a may slide in a right-hand direction, in the view as shown in Figure 6, and is otherwise provided with lateral tongues 19a and an extension (not shown) cooperating with a fillet in the groove 16a, in a manner similar to that provided in the embodiment already described. This construction limits the sliding movement of the cover member 18a to the open position or closed position. Latching means of the character described in connection with the first embodiment, comprising the bowed spring 28 and the groove 35 in the cover member, may be embodied in the end wall of the container 10a and the cover member 18a, respectively. In this embodiment, a compartment 37a is thereby provided for substantially the entire section of the container. A partition 36a serves to mount a closure element 39a connected by a hinge 40a and opening with a spring action by the coiled spring 42a.

Thus, upon sliding the cover member 18a to the open position, as shown in Figure 6, the closure 39a will spring open. As the cover member 18a is moved in a left-hand direction to the closed position, the sliding member of the cover member 18a will serve to close the closure element 39a into a position covering the compartment 37a. The closure element 39a is formed with mirrored surfaces to each surface thereof, so that a slight tilting movement as it is held by the user will make the mirrored surface available for viewing of the same.

In Figures 7 and 8, I have shown another embodiment of my invention, in which a container 10b is provided, with a cover member 18b thereon, having connection for sliding. The details thereof may be in the form as shown in Figures 5 and 6, so far as arrangements for sliding the cover member and for latching the same against accidental sliding movement in the form of the bowed spring 28b and the slot 35b, formed in the end wall 11b and cover member 18b, respectively. In this construction, the bottom is formed of a bevelled mirror 15b and the cover member may have adhesively attached thereto, a similar mirror which has been similarly designated by the numeral 15b. It will be observed that by this construction, a single compartment 37b is provided and that in opening the cover member 18b to the open position to render the contents of the compartment 37b accessible, the mirror on the cover member may be viewed at the same time that the compartment 37b is viewed, for purposes of facilitating the viewing of the contents of the compartment 37b and the mirror 15b mounted on the cover member, at a single glance.

While I have shown in connection with the embodiments illustrated in Figures 7 and 8, a cover member whose sliding movement is limited in one direction, it will be understood that the container illustrated in Figures 7 and 8 may have a cover member of the type illustrated in Figures 1 to 4, wherein the sliding movement may be in two directions from the aligned closed position.

In Figure 9, I have shown another embodiment of my invention in the form of a container 10c which in all respects is constructed identical with the embodiment illustrated in Figures 1 to 4. However, I have included as auxiliary closing means as a substitute closing means, a construction in the form of a loop 28c pivoted in the end walls 11c and 12c, respectively, by inwardly directing the ends 29c and 30c (not shown). The loop is pivoted to the position shown in Figure 9, the pivotal action being from a position looping over the cover member 18c to a position lying to one side of the side wall 13c.

To prevent accidental displacement of the loop 28c from the position shown in Figure 9, I am providing a frictional or spring depressible pawl 35c.

The spring depressible pawl 35c lies on the path of lateral ends of the loop 28c, offering frictional resistance to accidental pivotal movement.

It will thus be apparent by this construction, that the cover member may be slid to a left-hand or right-hand direction in position, from the aligned closed position, by first tilting the loop 28c to the position shown in the dotted lines in Figure 9, thereby releasing the cover for free slidable movement.

It will thus be observed that by the construction described and illustrated, I have devised a novelty container of exceedingly compact construction which maintains all parts for operation and use in a position which makes the contents readily accessible and easily viewed, and that operation may be accomplished with great facility by the movement of the fingers of one hand as the article is held by the user, leaving the other hand free for manipulation of the cosmetic preparations.

It will further be observed, while I have described my novelty container as having primary utility for the provision of a cosmetic compact, that this device is available for other fields of utility, wherever equally convenient operations may be found desirable.

Having thus described my invention and illustrated its use, what I claim as new and desire to secure by Letters Patent, is—

1. A novelty container or compact of a depth and width fitting comfortably in the hands of a user and capable of being spanned by the thumb and fingers of one hand, comprising in combination, a primary shallow receptacle and a cover member, guiding means on said container for slidingly mounting said cover member and operable for sliding by the relative movement of the thumb to the fingers when the container is held by the fingers, a partition within said container, a hingeable closure serving as a mirror connected with said partition member, spring means for urging said closure to the open position, said closure lying in the path of movement of said cover member to urge said closure member to the covering position upon movement of said cover member towards the aligned position of said cover member and receptacle, and frictional latching means in the path of movement of said cover member operable by the positive relative sliding movement of the cover member and receptacle for maintaining said cover member and receptacle in aligned position against accidental displacement.

2. A novelty container or compact of a depth and width fitting comfortably in the hands of a user and capable of being spanned by the thumb and fingers of one hand, comprising in combination, a primary shallow receptacle and a cover member, guiding means on said container for slidingly mounting said cover member and operable for sliding by the relative movement of the thumb to the fingers when the container is held by the fingers, a partition within said container dividing said receptacle into a plurality of compartments, a hingeable closure serving as a mirror connected with said partition member, spring means for urging said closure to the open position, said closure lying in the path of movement of said cover member to urge said closure member to the covering position upon movement of said cover member towards the aligned position of said cover member and receptacle, and frictional latching means in the path of movement of said cover member operable by the positive relative sliding movement of the cover member and receptacle for maintaining said cover member and receptacle in aligned position against accidental displacement, said guiding means being formed to permit slidable movement of said cover member over opposite edges of said receptacle to expose alternatively one of said compartments, said guiding means being formed with means for limiting the sliding movement of said cover member in either of the positions aforesaid.

THEODORE SCHISGALL.